United States Patent Office 2,802,855
Patented Aug. 13, 1957

2,802,855

CARBAMYLALKENYL PHOSPHORUS-CONTAINING ESTERS

Richard R. Whetstone, Orinda, Calif., and Alan R. Stiles, Denver, Colo., assignors to Shell Development Company, Emeryville, Calif., a corporation of Delaware No Drawing. Application April 27, 1953,
Serial No. 351,466

6 Claims. (Cl. 260—461)

This invention relates to a new class of phosphorus-containing esters which have been found to be particularly useful as insecticides.

The compounds of the invention are carbamylalkenyl phosphorus-containing esters of the formula:

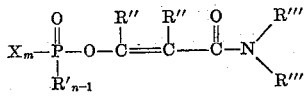

wherein X is a member of the class of radicals consisting of RO—, RNH— and $R_2N$— in which R is an alkyl group containing up to 6 carbon atoms; R' is a monovalent hydrocarbon radical; each R'' is a member of the class consisting of a hydrogen atom and an alkyl radical; each R''' taken singly is a member of the class consisting of a hydrogen atom, a monovalent hydrocarbon radical, a nitroaryl radical, a haloaryl radical, an alkoxyaryl radical, a cyanoaryl radical, an acyloxyaryl radical, and taken together in combination, a divalent hydrocarbon radical with 4 to 5 saturated carbon atoms in a chain between the two valences; $m$ is an integer of 1 to 2; and $n=3-m$. Thus, for example, R is any alkyl radical of up to 6 carbon atoms such as methyl, ethyl, isopropyl, butyl, isopentyl, hexyl or 3-hexyl. R' is any monovalent hydrocarbon radical such as methyl, ethyl, isobutyl, 3-hexyl, decyl, octadecyl, allyl, crotyl, oleyl, propargyl, phenyl, xylyl, diphenyl, naphthyl, cyclopentyl, cyclopentenyl, cycohexyl or isopropylcyclohexyl. Each R'' is the same or different and is a hydrogen atom or a methyl, ethyl, isobutyl, hexyl, 2-octyl, dodecyl, hexadecyl or any other alkyl radical. Taken singly, each R''' is the same or different and is a hydrogen atom or any monovalent hydrocarbon radical such as was exemplified for R'; or is a nitroaryl radical such as a p-nitrophenyl radical, an o-nitrophenyl radical, a nitrotolyl radical, a nitronaphthyl radical, etc.; or is a haloaryl radical such as a chlorophenyl radical, a bromophenyl radical, an iodotolyl radical, etc.; or is an alkoxyaryl radical such as a methoxyphenyl radical, a butoxytolyl radical, etc.; or is a cyanoaryl radical such as a cyanophenyl radical, a cyanonaphthyl radical, etc.; or is an acyloxyaryl radical such as an acetoxyphenyl radical, a butyroxyphenyl radical, etc. Taken together, the R'''s are a divalent hydrocarbon radical with 4 to 5 saturated carbon atoms in a chain between the two valences such as a tetramethylene radical, as in a pyrrolidyl group, or a pentamethylene radical, as in a piperidyl group, and homologues thereof. It will be noted from the above formula that when $m$ is the integer 1, $n-1=1$ and the compound is a phosphonate; and that when $m$ is the integer 2, $n-1=0$ and the compound is a related phosphate. Preferably, the compounds have alkyl groups as the hydrocarbon radicals, and it is further preferred that the compounds be derivatives of N,N-dialkyl alpha-chloroacetoacetamide.

The new compounds of the invention are prepared by reacting an appropriate phosphonite or phosphite with alpha-chloro beta-oxo fatty acid amide. Thus, when a dialkyl hydrocarbon-phosphonite is used, the reaction involved may be written as follows:

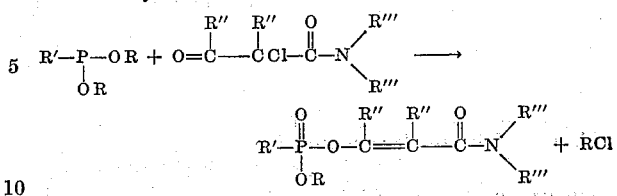

Similarly, when a trialkyl phosphite is used, the reaction involved may be written as follows:

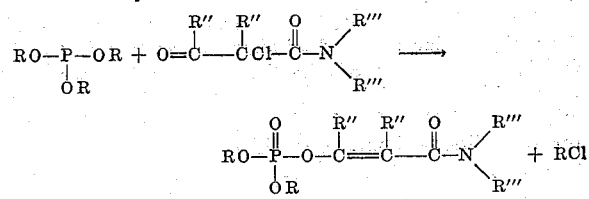

In like manner when an alkyl N,N,N',N'-tetraalkylphosphorodiamidite is used, the reaction involved may also be written as follows:

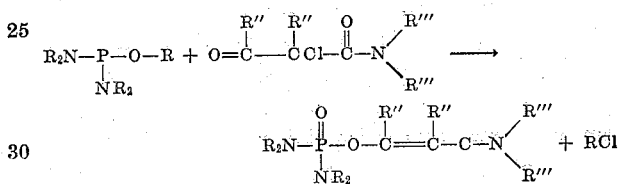

In these equations, the several R's represent the same kind of atoms or radicals as noted above for the first-mentioned formula.

The reactions are effected by adding about an equimolar amount of the chloroester to the phosphonite or phosphite, the addition usually being made slowly so as to avoid undue temperature increase of the reaction mixture from the exothermic heat of reaction. The reaction may be started with the reactants at an ordinary temperature of about 20° C. to 25° C., but for the most part is conducted preferably at a temperature between about 60° C. and 150° C. In some cases, the starting of the reaction is assisted by application of heat, and especially if large quantities of reactants are used, cooling is employed to control the temperature within the desired range. The formed alkyl chloride is preferably removed from the reaction mixture to greater or lesser extent by application of sufficient vacuum so the chloride is boiled out. When the boiling points of the formed alkyl chloride and the chloroester reactant are fairly close together, use of a distillation column for removal of the alkyl chloride is advisable for best results. Some of the higher reactants are solids at ordinary temperature, but use of an inert solvent such as xylene enables a fluid reaction system to be realized. Use of a solvent is not essential, however. The reaction is effected under substantially anhydrous conditions. In order to insure completion of the reaction after addition of chloroester, the reaction mixture is heated within the indicated temperature range for a reasonable time. The formed phosphonate or phosphate product is usually recovered by distillation under sufficiently low pressure that thermal decomposition is avoided. If desired, especially with higher compounds of the invention, crystallization or molecular distillation may be used for recovery of the desired product.

Although it is preferred to prepare the compounds from an alpha-chloro beta-oxo fatty acid amide in the manner described above, they may also be prepared from an alpha-bromo beta-oxo fatty acid amide by substitution of the bromo compound in place of the chloro compound.

Preparation of typical, but non-limiting, members of the class of new compounds of the invention are described in detail in the following examples wherein the parts are by weight.

*Example I*

Diethyl 1-dimethylcarbamyl-1-propen-2-yl phosphate of the formula

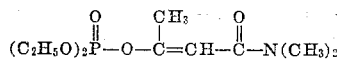

was prepared by reacting triethyl phosphite with alpha-chloro-N,N-dimethylacetoacetamide, which last-named compound was obtained by first reacting diketene with dimethylamine and then reacting the resulting N,N-dimethyl acetoacetamide with sulfuryl chloride in the following manner:

Diketene in amount of 126 parts (1.5 mols) was added drop-wise during a period of about an hour to a stirred solution of 68 parts of dimethylamine in 800 parts of water while maintaining the temperature of the reaction mixture at 0° C. to 15° C. The mixture was then stirred for an additional hour, after which the aqueous solution was evaporated to a residue of 180 parts which was distilled. The desired N,N-dimethyl acetoacetamide in amount of 142 parts distilled at 80–83° C. at 0.5 mm. pressure.

Sulfuryl chloride in amount of 143.5 parts (1.07 mols) was added drop-wise to 138 parts (1.07 mols) of N,N dimethyl acetoacetamide held at about 10° C., after which the mixture was warmed to 50° C. to remove the majority of the hydrogen chloride. The residue was then distilled and 156 parts of alpha-chloro-N,N-dimethylacetoacetamide was recovered which distilled at 93–98° C. at 0.5 mm. pressure. The liquid amide was found to contain 22.0% chlorine (theory: 21.7%).

Triethyl phosphite in amount of 158.5 parts (0.954 mol) was added drop-wise to 156 parts (0.954 mol) of alpha-chloro-N,N dimethyl acetoacetamide while maintaining the reaction mixture at 80–110° C. After the addition, the mixture was evacuated and it was found that 50 parts of material had collected in a cold trap, the theoretical amount of ethyl chloride formed would be 61.5 parts. The residue of the reaction mixture in amount of 254 parts was distilled and 145 parts of the desired diethyl 1-dimethylcarbamyl-1-propen-2-yl phosphate was collected. The phosphate was a liquid which undergoes molecular distillation at 132° C. under 1×10⁻⁵ mm. pressure and has a refractive index (20/D) of 1.4663. Analysis showed the ester contained 11.8% phosphorus (theory: 11.7%) and 4.9% nitrogen (theory: 5.3%). The ester was found to be soluble in water, in isopropyl alcohol, in acetone, and in benzene.

*Example II*

Diethyl 1-phenylcarbamyl-1-propen-2-yl phosphate of the formula

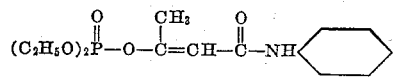

was prepared by adding 71 parts (0.426 mol) of triethyl phosphite dropwise with stirring to 90 parts (0.426 mol) of alpha-chloro-acetoacetanilide. The reaction caused the mixture to warm a little. After the addition was completed, the reaction mixture was heated to 100–110° C. and 14.5 parts of material was recovered in a cold trap cooled with an acetone-solid carbon dioxide bath upon evacuating the reaction mixture at a pressure of about 200 mm. The reaction mixture was permitted to cool to room temperature whereupon some crystallization occurred. The mixture was filtered and 12 parts of alpha-chloroacetoacetanilide were recovered. The filtrate was then subjected to molecular distillation and about 20 parts of material largely comprising alpha-chloroacetoacentanilide were recovered. The residue was dissolved in hot ethanol, and water was added to incipient cloudiness. On cooling, the product crystallized and was removed by filtration. This purification operation was repeated twice again, and the desired diethyl 1-phenylcarbamyl-1-propen-2-yl phosphate was recovered as a crystalline solid melting at 81–81.5° C. The phosphate was soluble in benzene, in isopropyl alcohol, and in acetone, but was insoluble in water. Analysis of the ester gave the following results:

|  | Found | Calculated |
| --- | --- | --- |
| Percent carbon | 52.9 | 53.7 |
| Percent hydrogen | 6.4 | 6.4 |
| Percent nitrogen | 4.4 | 4.5 |
| Percent phosphorus | 9.9 | 9.9 |

*Example III*

Diethyl 1-(p-nitrophenylcarbamyl)-1-propen-2-yl phosphate of the formula

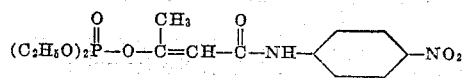

was prepared by reaction of triethyl phosphite with alpha-chloro-p-nitroacetoacetanilide. The latter was prepared by reaction of p-nitro-aniline with ethyl acetoacetate and then treating the resultant p-nitro-acetoacetanilide with sulfuryl chloride.

Triethyl phosphite in amount of 32.3 parts (0.195 mol) was added slowly with stirring to 50 parts (0.195 mol) of alpha-chloro-p-nitroacetoacetanilide. The reaction was exothermic and the temperature was maintained between about 80 and 120° C. by the rate of addition. An additional 10 parts of triethyl phosphite was added and the mixture heated at 120° C. for 30 minutes to insure complete reaction, the excess triethyl phosphite being removed later by distillation at low pressure. By-product ethyl chloride in amount of 11.7 parts (0.181 mol) was collected in a cold trap. The crude product was dissolved in hot ethanol and the solution decolorized with charcoal. Water was added to the clear hot filtrate from the charcoal treatment until incipient cloudiness occurred, after which the mixture was allowed to cool slowly. The crystalline product in amount of 34.2 parts was then recrystallized as above to give 30 parts (43% of theory) of diethyl 1-(p-nitrophenylcarbamyl)-1-propen-2-yl phosphate which was a crystalline solid having a melting point of 143–144° C. Analysis of the ester gave the following results:

|  | Found | Calculated |
| --- | --- | --- |
| Percent carbon | 47.2 | 47.0 |
| Percent hydrogen | 5.5 | 5.3 |
| Percent nitrogen | 7.7 | 7.8 |
| Percent phosphorus | 9.5 | 8.7 |

*Example IV*

Diethyl 1-(methylphenylcarbamyl)-1-propen-2-yl phosphate of the formula.

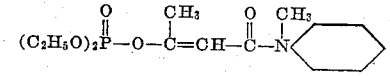

was prepared by reaction of triethyl phosphite and alpha-chloro-N-methylacetoacetanilide. Some 214 parts (2.0 mols) of N-methylaniline and 260 parts (2.0 mols) of ethyl acetoacetate were first mixed and heated for one hour in an open vessel. During this period, the temperature rose to about 200° C. The crude product was then cooled and reacted with about 1360 parts of 2 N sodium hydroxide solution. The crude insoluble sodium salt was collected by filtration, air dried to remove water and thoroughly washed with Skellysolve "A" (pentanes) to give 224 parts (53% of theory) of the sodium derivative of N-methylacetoacetanilide which analyzed as containing 10.7% sodium (10.8% calculated) and 6.3% nitrogen (6.6% calculated). Some 170 parts (0.9 mol) of N-methylacetoacetanilide was obtained in a crude state by dissolving 224 parts (1.05 mols) of the sodium derivative in a minimum amount of water, acidifying with dilute acetic acid, extracting with chloroform and distilling off the solvent. The N-methylacetoacetanilide was dissolved in about 375 parts of chloroform and slowly reacted with 146 parts (1.08 mols) of sulfuryl chloride. The temperature was maintained at about 10° C. during the reaction and afterwards raised to reflux temperature for 2.5 hours. The solvent was removed by distilling until the kettle contents reached 110° C. at 0.5 mm. pressure. About 133.5 parts (66% of theory) of alpha-chloro-N-methylacetoacetanilide was obtained by twice distilling the residue in a falling-film molecular still at 95–100° C. and 0.0005 mm. pressure. The product was a viscous liquid having a refractive index (19/D) of 1.5472. It analyzed as containing 20.7% chlorine (15.8% calculated) and 5.7% nitrogen (6.2% calculated).

Triethyl phosphite in amount of 41.5 parts (0.25 mol) was added slowly to 56.4 parts (0.25 mol) of alpha-chloro-N-methyl-acetoacetanilide. The temperature was increased about 95° C. to initiate the reaction and then was maintained at about 65° C. for 3 hours to complete the reaction. By-product ethyl chloride in amount of 12.3 parts (0.191 mol) was collected in a cold trap while heating the crude product at 65–95° C. under vacuum. Diethyl 1-(methylphenylcarbamyl) 1-propen-2-yl phosphate was obtained in amount of 58.4 parts (71.5% of theory) by twice distilling this crude product in a falling-film molecular still at 115–120° C. and 0.001 mm. pressure. The product was a viscous oil having a refractive index (20/D) of 1.5164. Analysis of the ester gave the following results:

|  | Found | Calculated |
| --- | --- | --- |
| Percent carbon | 54.6 | 55.1 |
| Percent hydrogen | 6.7 | 6.7 |
| Percent nitrogen | 4.3 | 4.3 |
| Percent phosphorus | 10.0 | 9.5 |

Other compounds of the invention are prepared in similar fashion. For example, methyl 1-carbamyl-1-propen-2-yl methylphosphonate is obtained by reacting alpha-chloroacetoacetamide with dimethyl methylphosphonite; ethyl 1-ethylcarbamyl-1-propen-2-yl butylphosphonate is obtained by reacting alpha-chloro-N-ethyl-acetoacetamide with diethyl butylphosphonite; ethyl 1-carbamyl-1-ethen-2-yl phenylphosphonate is obtained by reacting alpha-chloroformylacetanilide with diethyl phenylphosphonite; butyl 2 - diphenylcarbamyl - 3-methyl - 1-buten-1-yl cyclohexylphosphonate is obtained by reacting alpha - chloro - N,N - diphenyl - alpha - formylisovaleramide with dibutyl cyclohexylphosphonite; ethyl 1-allylcarbamyl-1-propen-2-yl allylphosphonate is obtained by reacting alpha-chloro-N-allylacetoacetamide with diethyl allylphosphonite; methyl 2-cyclohexylcarbamyl-2-buten-3-yl 2,4,6-trimethylphenylphosphonate is obtained by reacting alpha - chloro - N - cyclohexyl - alpha - acetopropionamide with dimethyl 2,4,6-trimethylphenylphosphonite; methyl 1-dimethylcarbamyl-1-propen-2-yl naphthylphosphonate is obtained by reacting alpha-chloro-N,N-dimethylacetoacetamide with dimethyl naphthylphosphonite; ethyl 3-ethylcarbamyl-2-tridecen-2-yl ethylphosphonate is obtained by reacting alpha-chloro-N-ethyl-alpha-acetolauramide with diethyl ethylphosphonite; diethyl 1-carbamyl-1-propen-2-yl phosphate is obtained by reacting alpha-chloroacetoacetamide with triethyl phosphite; diethyl 1-ethylcarbamyl-1-propen 2-yl phosphate is obtained by reacting alpha-chloro-N-ethylacetoacetamide with triethyl phosphite; dihexyl 1-carbamyl-1-ethen-2-yl phosphate is obtained by reacting alpha-chloro-formylacetamide with trihexyl phosphite; dibutyl 2-diphenylcarbamyl 3-methyl-1-buten-1-yl phosphate is obtained by reacting alpha-chloro-N,N-diphenyl-alpha-formylisolvaleramide with tributyl phosphite; diethyl 1-allylcarbamyl-1-propen-2-yl phosphate is obtained by reacting alpha-chloro-N-allylacetoacetamide with triethyl phosphite; dimethyl 2-cyclohexylcarbamyl-2-buten-3-yl phosphate is obtained by reacting alpha-chloro-N-cyclohexyl-alpha-acetopropionamide with trimethyl phosphite; diisopropyl 1-dimethylcarbamyl-1-propen-2-yl phosphate is obtained by reatcing alpha-chloro-NN-dimethylacetoacetamide with triisopropyl phosphite; diethyl 3-ethylcarbamyl-2-tridecen-2-yl phosphate is obtained by reacting alpha-chloro-N-ethyl-alpha-acetolauramide with triethyl phosphite; dimethyl 1-phenyl carbamyl-1-propen-2-yl phosphate is obtained by reacting alpha-chloro-acetoacetanilide with trimethyl phosphite; diethyl 1-(m-nitrophenylcarbamyl)-1-propen-2-yl phosphate is obtained by reacting alpha-chloro-m-nitro-acetoacetanilide with triethyl phosphite; dimethyl 1-(o-methoxyphenyl-carbamyl)-1-propen-2-yl phosphate is obtained by reacting alpha-chloro-o-methoxyacetoacetanilide with trimethyl phosphite; butyl 1-(p-bromophenylcarbamyl)-1-propen-2-yl methylphosphonate is obtained by reacting alpha-chloro-p-bromoacetoacetanilide with dibutyl methylphosphonite; N,N,N',N'-tetraethyl 1-carbamyl-1-propen-2-yl phosphorodiamidate is obtained by reacting alpha-chloroacetoacetamide with ethyl N,N,N',N'-tetraethylphosphorodiamidite; N,N' - dibutyl 1 - dimethylcarbamyl - 1 - propene - 2-yl phosphorodiamidate is obtained by reacting ethyl N,-N'-dibutylphosphoro diamidite with N,N-dimethyl 2-chloro-acetoacetamide; and N,N-diethyl 1-pentamethyl-enecarbamyl-1-propen-2-yl ethylphosphonamidate is obtained by reacting alpha-chloroacetoacetylpiperidide with ethyl N,N-diethylethyl-phosphonamidite. The chloroamide reactants can be prepared by reacting a beta-oxo fatty acid amide with sulfuryl chloride according to the method described in Ann., vol. 439, page 211 (1924). The beta-oxo fatty acid amides are obtainable by methods described in U. S. Patents 2,145,617; 2,152,132; 2,323,938 and 2,561,205. The phosphite and phosphonite reactants are readily obtainable by known methods referred to in the book by G. M. Kosolapoff, Organophosphorus Compounds (1950).

Many of the complex arylphosphonates of the invention are liquids at ordinary temperatures of 20° C. to 25° C. although higher members are crystalline solids at such normal temperatures. The new compounds are very useful substances for a variety of applications such as additives for lubricating oils and greases, as platicizers for vinyl resins and the like, and as raw materials of intermediates for synthesis of a variety of chemical products. The compounds have particular utility as insecticides because they possess outstanding properties when employed as contact insecticides. The compounds are highly toxic to insects, a term which is employed herein to include not only the members of the class Insecta, but also related or similar non-vertebrate animal organisms belonging to the allied classes of arthropods and including mites, ticks, spiders, wood lice, and the like.

The compounds of this invention can be employed for insecticidal purposes by the use of any of the methods which are conventionally employed in that art. For example, the compounds can either be sprayed or otherwise applied in the form of a solution or dispersion, or they can be absorbed on an inert, finely divided solid and applied as a dust. Useful solutions for application by spraying, brushing, dipping, and the like, can be prepared by using as the solvent any of the well-known inert horticultural carriers, including neutral hydrocarbons such as kerosene and other light mineral oil distillates of intermediate viscosity and volatility. Adjuvants, such as spreading or wetting agents, can also be included in the solutions, representative materials of this character being fatty acid soaps, rosin salts, saponins, gelatin, casein, long chain fatty alcohols, alkyl aryl sulfonates, long-chain alkyl sulfonates, phenolethylene oxide condensates, $C_{12}$ to $C_{20}$ amines and ammonium salts, and the like. These solutions can be employed as such, or, more preferably, they can be dispersed or emulsified and applied as a spray. Solid carrier materials which can be employed include talc, bentonite, lime, gypsum, pyrophyllite and similar inert solid diluents. If desired, the compounds of the present invention can be employed as aerosols, as by dispersing the same into the atmosphere by means of a compressed gas.

Many of the compounds can also be used as systemic poisons. In this case the compounds, either with or without a suitable carrier or diluent, can be applied to the soil in the vicinity of the growing plant to be protected (with the compound then being absorbed from the soil by the plant) or they can be applied directly to the plant where they are again distributed throughout the plant tissues. In either case the plant as a whole then becomes toxic to insects which consume any portion thereof.

The concentration of the compounds to be used with the above carriers is dependent upon many factors, including the particular compound utilized, the carrier employed, the method and conditions of application, and the insect species to be controlled, a proper consideration and resolution of these factors being within the skill of those versed in the insecticide art. In general, however, the compounds of this invention are effective in concentrations of from about 0.01 to 2% based upon the total weight of the composition, though under some circumstances as little as about 0.001% or as much as 5% or even more of the compound can be employed with good results from an insecticidal standpoint.

When employed as an insecticide, a compound of this invention can be employed either as the sole toxic ingredient of the insecticidal composition or it can be employed in conjunction with other insecticidally-active materials. Representative insecticides of this latter class include the naturally-occurring insecticides such as pyrethrum, rotenone, sabadilla, and the like, as well as the various synthetic insecticides, including DDT, benzene hexachloride, thiodiphenylamine, cyanides, tetraethyl pyrophosphate, parathion, azobenzene, and the various compounds of arsenic, lead, and/or fluorine.

In the following examples, the insecticidal qualities of two typical compounds of the invention described in Examples I and II, are demonstrated.

*Example V*

The LD–50 values for the compounds named in the table below were determined by spraying a solution containing different concentrations of the insecticide, in a neutral petroleum distillate boiling within the kerosene range, on Pinto bean plants infested with 2-spotted mite (*Tetranychus bimaculatus*). The LD–50 values given in the table represent the concentration in weight percent of the toxic agent in the solvent at which, under standard test conditions, a 50% mortality of the insects in each test was observed.

Toxic agent: LD–50
   Diethyl 1-dimethylcarbamyl-1-
     propen-2-yl phosphate_____ 0.02
   Diethyl 1-phenylcarbamyl-1-
     propen-2-yl phosphate_____ 0.15

*Example VI*

The residual toxicity of two compounds of the invention described in Examples I and II were determined. Emulsible concentrates were prepared containing by volume: 25% toxicant, 65% xylene, 5% Triton X 155 emulsifier, and 5% Triton B–1956. Portions of the concentrates were mixed and shaken with water in such proportions as to give the concentrations tabulated below. The aqueous emulsions were sprayed in uniform fashion on the underside of two primary leaves of potted Pinto bean plants. This was accomplished by fastening the tips of the two leaves in a vertical position with the upper surfaces touching each other and rotating the plants on a turntable while applying the spray. One day after the spray applications were made, the plants were infested with 2-spotted mites, *Tetranychus bimaculatus*. A mortality count of the mites was then made 24 hours later with the following results:

| Toxic Agent | Conc. Wt. Percent | Percent Mortality |
|---|---|---|
| Diethyl 1-dimethylcarbamyl-1-propen-2-yl phosphate | 1.25 | 94 |
|  | 0.25 | 13 |
| Diethyl 1-phenylcarbamyl-1-propen-2-yl phosphate | 1.25 | 98 |
|  | 0.25 | 25 |

We claim as our invention:

1. A compound represented by the formula:

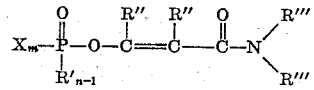

wherein X is a member of the class of radicals consisting of RO—, RNH— and $R_2N$— in which R is an alkyl group containing up to 6 carbon atoms; R' is a member of the class consisting of an allyl, crotyl, oleyl, propargyl, phenyl, xylyl, diphenyl, naphthyl, cyclopentyl, cyclopentenyl, cyclohexyl, isopropylcyclohexyl, and alkyl radicals of up to 18 carbon atoms; each R'' is a member of the class consisting of a hydrogen atom and an alkyl radical of up to 16 carbon atoms; each R''' is a member of the class consisting of a hydrogen atom, an allyl radical, a crotyl radical, an oleyl radical, a propargyl radical, a phenyl radical, a xylyl radical, a diphenyl radical, a naphthyl radical, a cyclopentyl radical, a cyclopentenyl radical, a cyclohexyl radical, an isopropylcyclohexyl radical, an alkyl radical of up to 18 carbon atoms, a mononitroaryl radical of 6 to 10 carbon atoms, a halophenyl radical, an alkoxyphenyl radical containing up to 4 carbon atoms in alkoxy group, an alkoxytolyl radical containing up to 4 carbon atoms in the alkoxy group, and an acyloxyphenyl radical with the acyloxy group thereof being saturated and containing 2 to 4 carbon atoms; $m$ is an integer of 1 to 2; and $n=3-m$.

2. Ethyl 1-carbamyl-1-ethen-2-yl phenylphosphonate.

3. Diethyl 1 - dimethylcarbamyl-1-propen-2-yl phosphate.

4. Diethyl 1-phenylcarbamyl-1-propen-2-yl phosphate.

5. Diethyl 1 - (p - nitrophenylcarbamyl)-1-propen-2-yl phosphate.

6. Diethyl 1 - (methylphenylcarbamyl)-1-propen-2-yl phosphate.

References Cited in the file of this patent

UNITED STATES PATENTS 2,494,283    Cassaday et al._____ Jan. 10, 1950